United States Patent [19]

Grünert

[11] 4,027,126

[45] May 31, 1977

[54] SHORTING AND GROUNDING ARRANGEMENT FOR GAS-INSULATED BUS BARS

[75] Inventor: Gerhard Grünert, Erlangen, Germany

[73] Assignee: Siemens Aktiengesellschaft, Munich, Germany

[22] Filed: Dec. 11, 1974

[21] Appl. No.: 531,696

[30] Foreign Application Priority Data

Dec. 14, 1973 Germany .......................... 2362297

[52] U.S. Cl. ........................ 200/148 B; 200/148 R
[51] Int. Cl.² ...................................... H01H 33/70
[58] Field of Search .......... 200/56 AA, 144 B, 145, 200/146 R, 146 A, 148 R, 148 B, 148 F, 163

[56] References Cited

UNITED STATES PATENTS

| | | | |
|---|---|---|---|
| 2,813,177 | 11/1957 | Eberhard et al. | 200/148 F X |
| 3,070,770 | 12/1962 | Mercier | 200/163 X |
| 3,590,187 | 6/1971 | Kane et al. | 200/148 R |
| 3,778,574 | 12/1973 | Clark | 200/148 R X |
| 3,793,494 | 2/1974 | Cleaveland | 200/50 AA |
| 3,855,434 | 12/1974 | Grunert et al. | 200/144 B |

FOREIGN PATENTS OR APPLICATIONS 633,520 7/1936 Germany

*Primary Examiner*—James R. Scott
*Attorney, Agent, or Firm*—Kenyon & Kenyon Reilly Carr & Chapin

[57] ABSTRACT

A shorting and grounding arrangement for enclosed, gas-insulated bus bars in which an opening in the enclosure is provided and a pot placed over the opening, the pot containing a contact movably supported therein and having an advance contact, the main contact and advance contact both being adapted to mate with contacts on the bus bar, in which the advance contact is connected through a movable electrical connection with a rigid terminal on the outside wall of the pot to permit larger residual voltages to be shorted through the use of the advance contact and switch gear arranged outside the enclosure.

2 Claims, 4 Drawing Figures

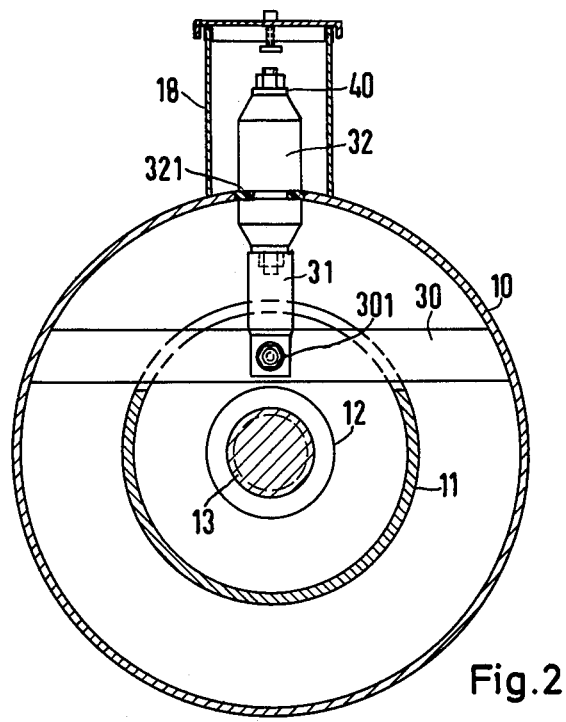
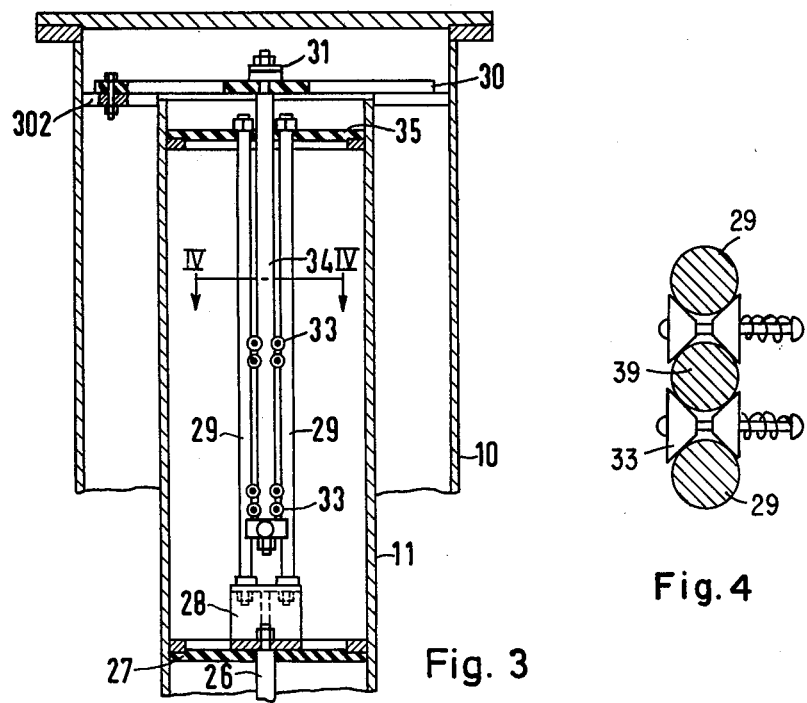

SHORTING AND GROUNDING ARRANGEMENT FOR GAS-INSULATED BUS BARS

BACKGROUND OF THE INVENTION

This invention relates to the shorting and grounding of enclosed gas-insulated bus bars in general and more particularly to an improved arrangement which permits shorting higher residual generator currents.

Shorting and grounding devices for bus bars are necessary in order to insure that no voltages are present in installations on which work is being performed. Thus, such devices must be designed so that, even if the part being worked upon, and which is shorted to ground, is accidentally connected to voltage-carrying parts, the potential of the portion of the bus bar which is shorted will have essentially no voltage with respect to ground. In the event of an unintentional energizing of such a bus bar, the shorting and grounding device must have sufficient short circuit capacity to insure this condition. When such a device is to be used for short circuiting a generator output lead, it is particularly desirable to have a contact arrangement including an advance contact the purpose of which is to short out the residual currents which might be present so that at the time of closing the main contacts, no current will be flowing and thus no arcing will occur.

A type of shorting and grounding device not including an advance contact but which does include a pot containing a movable contact mounted over an opening in the enclosure around the bus bar is described in U.S. patent application Ser. No. 434,357 filed Jan. 17, 1974 now abandoned. An advance contact arrangement which can be used in an installation of this type is disclosed in U.S. patent application Ser. No. 369,228 filed June 12, 1973 now U.S. Pat. No. 3,855,434. This arrangement which is particularly useful for shorting generator leads utilizes a vacuum switching tube connected to the advance contact at a movably supported contact. The vacuum switching tube is connected in an electrically conducting manner with a movable contact arm and the latter connected with a contact arms of other shorting devices through connecting straps. With this arrangement, the residual current is shorted using the vacuum switching tubes through the connecting straps after the advance contact is inserted into a mating contact on the bus bar. This arrangement operates quite satisfactorily. However, with the planned use of generators having higher power limits than is presently common, for example more than 15 MVA, the residual currents which must be handled become increasingly larger. As a result, the vacuum switching tube shorting device of the aforementioned application can probably not be used in such an application since the necessary increase in the switching capacity of such a vacuum switching tube would necessitate an increase in its dimensions such that it could no longer be built into the movable contact.

As a result, the need for a shorting device for gas-insulated bus bars in which relatively large residual currents must be shorted through the use of advance contacts becomes evident.

SUMMARY OF THE INVENTION

The present invention provides such a shorting and grounding device. The arrangement starts out basically the same as that of the aforementioned patent application. That is to say, an enclosed bus bar is provided with a fixed contact and a movable contact is supported on a pot mounted over an opening in the enclosure. In accordance with the present invention an advance contact is connected through a movable electrically conducting connection to a rigid terminal mounted to the outside wall of the pot. By so doing, the movably supported advance contact is connected to a rigid connection point at the outside wall of the vessel in an electrically conducting manner. This then makes possible the switching of larger residual currents by connecting suitable switch gear outside the shorting device itself. In other words, the movable contacts can be moved so that it mates with its mating contact on the bus bar after which auxiliary switch gear outside the arrangement can be closed to short out the residual current before contact is made between the main movable contact and its mating contact on the bus bar. Once the two or three pole short circuit currents are cancelled in this manner, the movably supported main contact is then brought fully into engagement with its mating contact on the bus bar. The shorting and grounding connections formed thereby between the gas-insulated bus bar and the main contact can then carry the relatively large short circuit currents which will occur if the system is accidentally energized.

A particularly favorable embodiment of the invention is disclosed in which the electrically conducting connection is established using contact rollers between two individual elements which are firmly connected with the respective movable contact and the pot. As illustrated, two contact rods can be firmly connected to the pot. In this arrangement, the third contact rod is located between the first two contact rods with contact rollers therebetween. With such a design, a relatively simple arrangement has been found which permits electrically connecting the movable advance contact mounted within the movably supported main contact with a rigid terminal on the outside wall of the pot.

BRIEF DESCRIPTION OF THE DRAWINGS

FIG. 2 is a cross-sectional plan view of the arrangement of FIG. 1 along the line II—II.

FIG. 3 is an additional cross-sectional view taken along the line III—III illustrating in more detail the manner of electrically connecting the movable advance contact and the external fixed contact.

FIG. 4 is a cross sectional view taken along the line IV—IV illustrating the electrically connecting movable advance contact arrangement.

DETAILED DESCRIPTION OF THE PREFERRED EMBODIMENT

Figure 1:
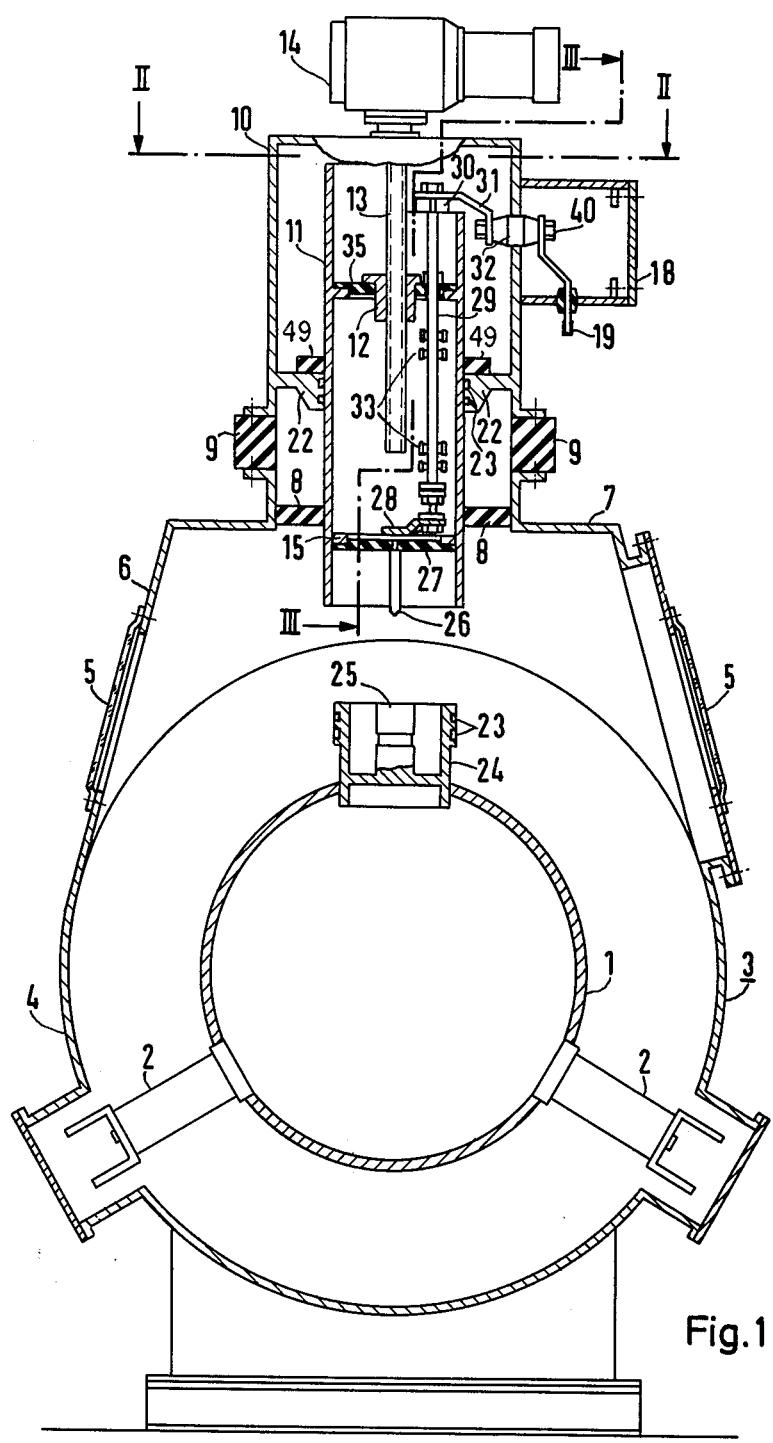
FIG. 1 is a cross-sectional elevation view of a one-pole shorting arrangement according to the present invention.

Shown on FIG. 1 is a bus bar 1 held concentrically with respect to an enclosure 3 by means of insulators 2. The enclosure is generally cylindrical. However, in the area of the shorting and grounding device, the enclosure comprises a cylindrical part 4, connecting parts 6 sloped upward and a flat portion 7. Windows 5 are provided in the sloping portion 6. The top flat portion 7 is flanged and contains an opening into which the pot 10 holding the movable contacts is attached. The pot is secured to the enclosure by a suitable bolting and is separated therefrom by an insulating ring 9. The dimensions of the pot 10 are such that it can support a movable contact 11 of a hollow cylindrical shape.

Within the movable main contact 11, a nut 12 is provided which engages a screw 13 attached to means 14 for moving the contact 11 in and out. These means can comprise an electrically motor drive and may also include a hand wheel for manual operation.

The movable contact 11 is supported inside the pot 10 by a fixed contact 22 having contact connections 23 placed in grooves therein. These contact connections 23 are essentially of the same type designated as fingers 126 in U.S. Pat. No. 3,778,574 i.e. they are spring loaded contacts. A similar arrangement is also illustrated on FIGS. 3 and 4 of U.S. Pat. No. 3,070,770. Since these contacts are of a conventional design, they are not shown in detail herein. Furthermore, it is guided by an insulator 8 and an insulator 49, both of which are disc-shaped. Affixed to the bus bar 1 is a mating contact 24 having contact portions 23 essentially the same as those on the contact member 22. In the center of the fixed contact 24 is a separate contact 25 for mating with an advance contact 26 contained inside the main contact 11. The advance contact 26 is located in the center of the main contact 11 and is supported by an insulating support plate 27 which is held in place using a fastening ring 15. In operation, as the main contact 11 is driven down by proper rotation of the screw 13, the advance contact 26 first mates with the contact 25 after which the main contact 11 mates with the contact 24. As will be more fully described below, the advance contact 26 is electrically connected to an external terminal 40 to which may be attached external switch gear. In the time between the contact between advance contact 26 and mating contact 25 and contact between the main contact 11 and contact 24, such external switch gear will be operated to short out any residual current. Once contact is made between the main contact 11 and the bus bar contact 25, a current path is established therethrough to the contact 22 which is coupled in an electrically conducting manner with the pot 10. The pot 10 may then be connected to ground or other enclosures in the manner illustrated in the aforementioned patent applications. Thus, a path capable of carrying the current which will occur upon accidental energization of the bus bar 1 is established and those working thereon are safely protected.

With the arrangement shown it is thus possible to either couple the bus bar 1 to other bus bars or to ground the bus bars without opening the enclosure thereby permitting work to be performed on the bus bars and parts electrically connected to them.

In accordance with the present invention, the advance contact 26 is electrically coupled to a terminal 40 located external to the pot 10 and enclosure 3. To establish this connection, the advance contact 26 is electrically connected to a connecting piece 28 which in turn is electrically connected to a pair of contact rods 29 which can be seen in more detail on FIG. 3.

Between the two contact rods 29 is a third contact rod 34 which is rigidly connected to the pot 10. This is a firm, mechanical connection but is an electrically insulating connection, an insulating support member 30 being used to make the connection. A connecting piece 31, more fully shown in FIG. 2, which is a view III—III of FIG. 1, connects the external contact 40 with a bushing 32 provided to insulate the connection from the pot 10. As shown on FIG. 1, the terminal 40 can then be connected to a cable 19 or the like running to external switch gear. A housing 18 is placed around the terminal 40 to avoid unintentional contact therewith.

With further reference to FIG. 2, the main contact 11 is seen centrally disposed with in the pot 10. Also visible is the nut 12 and screw 13 used for moving that contact. The insulating support plate 30 supporting the rod 34 of FIG. 3 can be seen as can a nut 301 connecting the connecting piece 31 to the top of the rod. With this arrangement shown on FIGS. 2 and 3, the support piece 30 rigidly connects the rod 34 to the pot 10, but insulates it therefrom. Support piece 30 is connected to the pot 10 at support points 302 which are welded to the pot 10 and have suitable holes for establishing connection using conventional nuts and bolts. The rod 34 has a threaded portion which passes through a suitable hold in the support member 30 and is then fastened with the nut 301 to the support and the connecting piece 31. The connecting piece is similarly connected with a nut and bolt connection to a terminal bushing 32 which passes through the pot 10 and is supported in an insulating piece 321 placed within a hole in the pot 10. Also shown on FIG. 2 is the protective chamber 18 for protecting against unintentional contact with the terminal 40.

The manner in which electrical contact is established between the rods 29 and the rods 34 is illustrated on FIG. 3 and also on the cross sectional view of FIG. 4. As described above, the advance contact 26 is connected to the connecting piece 28. As shown, it is bolted thereto in conventional fashion. Also bolted to the connecting piece 28 are the rods 29. The other ends of the rods are bolted to an insulating member 35 supported near the top of the main contact 11. The rod 34 is supported between the two rods 29 in the manner described above. To establish a movable electrical connection between the contact rods, contact rollers 33 are provided therebetween. As shown, these contact rollers are spring loaded to maintain proper contact and can be linked together if desired. A similar construction to this is illustrated in German Pat. No. 633,520. Thus, as the movable contact 11 is lowered toward the bus bar relative motion between the contact rod 29 and the contact rod 34, while still maintaining an electrically connection, can occur.

In operation, when it is desired to short out the bus bar 1, the contact 11 will be lowered by a proper rotation of the screw 13. As the contact 11 is lowered the rods 29 will move therewith sliding against the rollers 33 and maintaining contact with the rod 34. When the contact 26 engages the contact 25, an electrical connection will be established between the bus bar 1 and the terminal 40, through the contact 26, connecting piece 28, the rods 29, rollers 33, and rod 34, the connecting piece 31 and bushing 32. Any residual current may now be shorted out to ground using an externally connected switching device connected by a suitable cable 19 to the terminal 40. The main contact 11 may then be lowered the remaining distance to make firm contact with the contact pieces 23 on contact 24 to establish a good current path between the bus bar 1 and the pot 10. The pot 10 may then be connected to other conductors or ground in conventional fashion.

Thus, an improved shorting and grounding device which permits operation with large generators where large residual currents are present has been shown. Although a specific embodiment has been illustrated and described, it will be obvious to those skilled in the art that various modifications may be made without departing from the spirit of the invention which is intended to be limited solely by the appended claims.

What is claimed is:

1. A shorting and grounding device for an enclosed gas-insulated bus bar having an opening in the enclosure with a pot placed thereon containing a main contact which is movably supported therein, said main contact having an advance contact, with mating contacts at the bus bar for said advance contact and main contact, in which the improvement comprises:
   a. a rigid terminal attached to the outside wall of the pot and insulated therefrom; and
   b. a sliding contact arrangement movable with said main contact for establishing an electrically connection between said advance contact and said rigid terminal, said sliding contact and advance contact supported on the main contact in an insulated manner, said arrangement comprising:
      1. first conductive means rigidly connected to said movable main contact through means insulating it therefrom;
      2. second conductive means rigidly coupled to said pot through means insulating it therefrom; and
      3. contact rollers between said first and second means for establishing an electrically conducting path therebetween.

2. Apparatus according to claim 1 wherein said first means comprises first and second contact rods rigidly coupled to said movable main contact, said second means comprises a third contact rod rigidly coupled to said pot and wherein said third contact rod is disposed between said first and second contact rods with said contact rollers between said first and said second and third contact rods.

* * * * *